(12) United States Patent
Kikuchi et al.

(10) Patent No.: US 12,092,371 B2
(45) Date of Patent: Sep. 17, 2024

(54) TEMPERATURE CONTROL APPARATUS

(71) Applicant: SMC CORPORATION, Chiyoda-ku (JP)

(72) Inventors: Ryo Kikuchi, Tsukuba (JP); Tatsuya Amano, Tsukubamirai (JP); Haruhiko Tokui, Moriya (JP)

(73) Assignee: SMC CORPORATION, Chiyoda-ku (JP)

( * ) Notice: Subject to any disclaimer, the term of this patent is extended or adjusted under 35 U.S.C. 154(b) by 98 days.

(21) Appl. No.: 16/837,082

(22) Filed: Apr. 1, 2020

(65) Prior Publication Data
US 2020/0318861 A1    Oct. 8, 2020

(30) Foreign Application Priority Data

Apr. 2, 2019    (JP) .................................. 2019-070764

(51) Int. Cl.
*F24H 9/20*    (2022.01)
*F04D 29/58*    (2006.01)
(Continued)

(52) U.S. Cl.
CPC ............. *F24H 9/2007* (2013.01); *F24H 7/02* (2013.01); *F24H 15/174* (2022.01);
(Continued)

(58) Field of Classification Search
CPC . F24H 9/2007; F24H 7/02; F24H 1/16; F24H 9/13; F24H 15/174; F24H 15/219;
(Continued)

(56) References Cited

U.S. PATENT DOCUMENTS 4,739,634 A * 4/1988 Watanabe ................. F25B 9/02
62/51.1
4,895,203 A * 1/1990 McLaren .................. F28F 9/00
165/41
(Continued)

FOREIGN PATENT DOCUMENTS

CN        2144289 Y    10/1993
CN        2221199 Y     2/1996
(Continued)

OTHER PUBLICATIONS

CN 206683426 U Translation (Year: 2017).*
(Continued)

*Primary Examiner* — Elizabeth J Martin
*Assistant Examiner* — Dario Antonio Deleon
(74) *Attorney, Agent, or Firm* — Oblon, McClelland, Maier & Neustadt, L.L.P.

(57) ABSTRACT

In a temperature control apparatus for controlling the temperature of a load by supplying high-temperature circulating liquid to the load, a device in which a helical channel portion of a first heat exchange channel through which circulating liquid flows is housed in a second heat exchange channel formed of a channel space in a hollow shell through which coolant flows is used as a heat exchanger for cooling the circulating liquid, cylindrical members are individually fitted on an inflow channel portion and an outflow channel portion connected to opposite ends of the helical channel portion of the first heat exchange channel, and the cylindrical members are each fixed to the shell of the heat exchanger with a weld.

8 Claims, 4 Drawing Sheets

(51) Int. Cl.
| | |
|---|---|
| *F24H 7/02* | (2022.01) |
| *F24H 15/12* | (2022.01) |
| *F24H 15/128* | (2022.01) |
| *F24H 15/174* | (2022.01) |
| *F24H 15/219* | (2022.01) |
| *F24H 15/223* | (2022.01) |
| *F24H 15/242* | (2022.01) |
| *F24H 15/248* | (2022.01) |
| *F24H 15/34* | (2022.01) |
| *F24H 15/355* | (2022.01) |
| *F25D 17/02* | (2006.01) |
| *F28F 27/00* | (2006.01) |
| *G05D 23/00* | (2006.01) |
| *G05D 23/12* | (2006.01) |
| *G05D 23/13* | (2006.01) |

(52) U.S. Cl.
CPC .......... *F24H 15/219* (2022.01); *F24H 15/34* (2022.01); *F25D 17/02* (2013.01); *G05D 23/00* (2013.01); *G05D 23/12* (2013.01); *G05D 23/132* (2013.01); *F04D 29/58* (2013.01); *F24H 15/12* (2022.01); *F24H 15/128* (2022.01); *F24H 15/223* (2022.01); *F24H 15/242* (2022.01); *F24H 15/248* (2022.01); *F24H 15/355* (2022.01); *F28F 27/00* (2013.01)

(58) Field of Classification Search
CPC ........ F24H 15/34; F24H 15/12; F24H 15/128; F24H 15/223; F24H 15/242; F24H 15/248; F24H 15/355; F28F 27/00; F28F 2240/00; F28F 2275/06; G05D 23/12; G05D 23/132; G05D 23/00; F25D 17/02; F25D 31/005; F25D 29/005; F04D 29/58; F28D 7/024; F28D 7/10; H05B 1/0244; F16L 19/08; H01L 21/67098
See application file for complete search history.

(56) References Cited

U.S. PATENT DOCUMENTS

| | | | | |
|---|---|---|---|---|
| 5,309,987 | A * | 5/1994 | Carlson | F28F 9/22 165/159 |
| 6,076,597 | A * | 6/2000 | Manning | F28D 7/024 165/163 |
| 6,102,106 | A | 8/2000 | Manning et al. | |
| 6,736,198 | B2 * | 5/2004 | Zhu et al. | F28D 7/024 165/156 |
| 2004/0068997 | A1 * | 4/2004 | Hirooka | H01J 37/32724 62/175 |
| 2010/0206519 | A1 * | 8/2010 | Cho | H01L 21/67248 165/104.19 |
| 2021/0180874 | A1 * | 6/2021 | Eadelson | F28D 15/043 |

FOREIGN PATENT DOCUMENTS

| | | | | |
|---|---|---|---|---|
| CN | 1488913 A | 4/2004 | | |
| CN | 102472594 A | 5/2012 | | |
| CN | 203177697 U | 9/2013 | | |
| CN | 203203433 U | 9/2013 | | |
| CN | 206683426 U | * 11/2017 | ............... | F28B 1/00 |
| JP | 2004-251486 A | 9/2004 | | |
| JP | 2015-148399 A | 8/2015 | | |

OTHER PUBLICATIONS

Extended European Search Report issued Aug. 27, 2020 in corresponding European Patent Application No. 20162815.3, 9 pages.
Chinese Office Action issued in Chinese Patent Application No. 202010240431.0 on Sep. 26, 2022, (w/ English Translation).
Lu Yan, Xie Fengyl "Chmical Machinery," Petrochemical Industry Press, pp. 108-110, Jul. 1975, (w/ English Translation).
Tonagaji, "General Basic Knowledge of Gas Engineering," China Architecture University Press, p. 459, May 1996, (w/ English Translation).
Chinese Office Action issued in Chinese Patent Application No. 202010240431.0 on Nov. 17, 2023, (w/ English Translation).
Chinese Office Action issued in Chinese Patent Application No. 202010240431.0 on Aug. 31, 2023, (w/ English translation).

* cited by examiner

TEMPERATURE CONTROL APPARATUS

TECHNICAL FIELD

The present invention relates to temperature control apparatuses that control the temperature of a load to a desired temperature by supplying circulating liquid whose temperature is regulated to the load, and in particular, to a temperature control apparatus suitable for controlling the temperature of the load to a high temperature.

BACKGROUND ART

Temperature control apparatuses for controlling the temperature of a load by supplying temperature-regulated circulating liquid to the load are widely known, as disclosed in PTL 1 and PTL 2, for example. The temperature control apparatuses disclosed in such patent literatures include a circulating liquid circuit for circulating the circulating liquid to and from the load and a cooling circuit for cooling the circulating liquid, which are arranged in parallel and connected to each other via tanks and valves.

Some semiconductor manufacturing apparatuses require to control the temperature of the load to a temperature significantly above the boiling point of water (100° C.) under atmospheric pressure, as disclosed in PTL 2, for example. In such temperature control apparatuses, for example, the temperature of the circulating liquid changes significantly or the difference in temperature between the circulating liquid and the cooling liquid increases significantly in controlling the temperature of the circulating liquid. For that reason, a design that takes into account the use of the circulating liquid at high temperatures should be required.

However, it can be hardly said that known apparatuses take sufficient measures against using the circulating liquid at high temperatures. This leads to a strong demand for development of a temperature control apparatus designed especially for high temperature use of the circulating liquid.

CITATION LIST9

Patent Literature

[PTL 1] Japanese Unexamined Patent Application Publication No. 2004-251486
[PTL 2] Japanese Unexamined Patent Application Publication No. 2015-148399

SUMMARY OF INVENTION

Technical Problem

A technical problem of the present invention is to provide a temperature control apparatus designed especially for high temperature use of circulating liquid in controlling the load at high temperatures.

Solution to Problem

To solve the above technical problem, a temperature control apparatus according to the present invention is a temperature control apparatus for controlling an external load to a predetermined high temperature by regulating circulating liquid having a boiling point higher than 100° C. to a temperature higher than 100° C. and supplying the circulating liquid to the load, wherein the temperature control apparatus includes a tank storing circulating liquid and including a heater for heating the circulating liquid, a discharge channel connecting the tank and a circulating-liquid ejection port for discharging the circulating liquid to the load, a circulation pump that pumps the circulating liquid from the tank to the discharge channel, a return channel connecting a circulating-liquid return port that receives the circulating liquid returned from the load and the tank, a heat exchanger including a first heat exchange channel through which the circulating liquid flows and a second heat exchange channel through which coolant for cooling the circulating liquid in the first heat exchange channel, a cooling circulation forward path for supplying the circulating liquid from the tank to the first heat exchange channel of the heat exchanger, a cooling circulation reverse path for returning the circulating liquid cooled by the heat exchanger from the first heat exchange channel to the tank, a coolant supply path for introducing the coolant to the second heat exchange channel of the heat exchanger, and a coolant discharge path for discharging the coolant after the heat exchange from the second heat exchange channel. In the heat exchanger, the first heat exchange channel includes a helical channel portion extending in a helical form along an axis, an inflow channel portion connected to one end of the helical channel portion and including a circulating-liquid inlet, and an outflow channel portion connected to the other end of the helical channel portion and including a circulating-liquid outlet, and the second heat exchange channel is a channel space formed in a hollow shell. The helical channel portion of the first heat exchange channel is housed in the second heat exchange channel in the shell, the inflow channel portion and the outflow channel portion are let out from the shell, the cooling circulation forward path is connected to the circulating-liquid inlet, and the cooling circulation reverse path is connected to the circulating-liquid outlet. The coolant supply path communicates with the second heat exchange channel through a coolant inlet provided on the shell, and the coolant discharge path communicates with the second heat exchange channel through a coolant outlet provided on the shell.

In this case, preferably, cylindrical members made of metal are individually fitted on the inflow channel portion and the outflow channel portion of the first heat exchange channel made of a metal pipe, wherein the shell made of metal includes a pair of mounting openings for letting the inflow channel portion and the outflow channel portion out from the shell and for mounting the cylindrical members fitted on the channel portions into the shell from the outside, and wherein, at the mounting openings, outer peripheries of the cylindrical members are fixed to the shell by welding. More preferably, the cylindrical members fitted on the inflow channel portion and the outflow channel portion each include a cylindrical body made of metal and a ring-shaped sealing member made of metal disposed on an inner periphery of the cylindrical body to seal an outer periphery of the channel portion, wherein an outer periphery of the cylindrical body is welded to the shell in a ring shape.

More preferably, the cylindrical body includes a fixing cylindrical portion fixed to the shell by the welding and a sealing cylindrical portion having the ring-shaped sealing member on the inner periphery thereof, wherein the sealing cylindrical portion is fastened to the fixing cylindrical portion by screwing, and wherein the ring-shaped sealing member is acutely angled at an end edge adjacent to the fixing cylindrical portion, wherein, when the sealing cylindrical portion is screwed to the fixing cylindrical portion, the end edge of the ring-shaped sealing member is brought into pressure-contact with each of the outer peripheries of the inflow channel portion and the outflow channel portion into a bitten state by pressure of the sealing cylindrical portion.

In the temperature control apparatus according to the present invention, preferably, in the shell, the coolant outlet to which the coolant discharge path is connected is disposed at one axial end at which the inflow channel portion is disposed, and the coolant inlet to which the coolant supply path is connected is disposed at the other axial end at which the outflow channel portion is disposed.

In the temperature control apparatus according to the present invention, preferably, the temperature control apparatus includes a discharge-side temperature sensor provided in the discharge channel to measure a temperature of the circulating liquid discharged to the load and a control unit including a temperature setting unit for setting the temperature of the circulating liquid to be discharged to the load, the control unit being for controlling rotational speeds of the circulation pump and the cooling pump based on a measurement result of the discharge-side temperature sensor and a temperature set by the temperature setting unit, wherein the circulation pump is immersed in the circulating liquid in the tank, and wherein the control unit is configured, when the temperature of the circulating liquid set by the temperature setting unit is lower than a predetermined threshold temperature, to maintain the rotational speed of the circulation pump to a low rotational speed, and when the temperature is higher than the predetermined threshold temperature, to maintain the rotational speed of the circulation pump to a high rotational speed.

More preferably, the control unit is configured, when the set temperature is increased by the temperature setting unit, to decrease the rotational speed of the cooling pump once and thereafter gradually increase the rotational speed, and when the set temperature is decreased, to increase the rotational speed of the cooling pump once and thereafter gradually decrease the rotational speed, and when the temperature of the circulating liquid measured by the discharge-side temperature sensor s equal to the set temperature, to maintain the rotational speed at that time.

More preferably, the control unit is configured such that, in increasing the set temperature, the higher the set temperature, the smaller a gradient of a change in the rotational speed of the cooling pump when the rotational speed is decreased once and is thereafter gradually increased, and in decreasing the set temperature, the lower the set temperature, the smaller an gradient of a change in the rotational speed when the rotational speed is increased once and is thereafter gradually decreased.

A pressure regulation unit for regulating the pressure of the coolant flowing through the channel of the coolant may be connected to the channel of the coolant.

Advantageous Effects of Invention

The present invention uses a device in which a helical channel portion of a first heat exchange channel through which circulating liquid flows is housed in a second heat exchange channel formed of a channel space in a hollow shell through which coolant flows as a heat exchanger for cooling the circulating liquid. In a preferable form, cylindrical members are individually fitted on an inflow channel portion and an outflow channel portion connected to opposite ends of the helical channel portion of the first heat exchange channel, and the cylindrical members are each fixed to the shell of the heat exchanger with a weld. This simplifies the structure of the heat exchanger to minimize the welded portions and prevents the occurrence of problems, such as cracks, at the welded portions due to the temperature difference between the circulating liquid and the coolant as much as possible. As a result, the durability of the temperature control apparatus against the use of the high-temperature circulating liquid can be enhanced.

In another preferable form of the present invention, the circulation pump is immersed in the circulating liquid in the tank unit, and when the set temperature of the circulating liquid is higher than a predetermined threshold temperature, the rotational speed of the circulation pump is maintained at a high rotational speed. This allows the temperature of the circulating liquid to be efficiently increased to a set temperature and to be maintained at the temperature also using the heat generated in the circulation pump.

In still another preferable form of the present invention, when the set temperature of the circulating liquid is set from a temperature higher than the threshold temperature to a lower temperature, the rotational speed of the circulation pump is decreased to a lower rotational speed and is maintained at the lower rotational speed, and at the same time, the rotational speed of the cooling pump increases. This allows suppressing the heat generation of the circulation pump and accelerating the cooling of the circulating liquid with the heat exchanger, thereby efficiently decreasing the temperature of the circulating liquid to the set temperature.

In still another preferable form of the present invention, a pressure regulation unit is connected to the coolant channel. Thus, even if the coolant is expanded by boiling or the like as a result of heat exchange with the high-temperature circulating liquid, a problem, such as breakage, in the channel can be prevented by adjusting the pressure of the coolant with the pressure regulation unit.

Thus, according to the present invention and the preferable forms of the present invention, a temperature control apparatus designed especially for using high-temperature circulating liquid in controlling a load to a high temperature can be provided.

DESCRIPTION OF EMBODIMENTS

Figure 1:
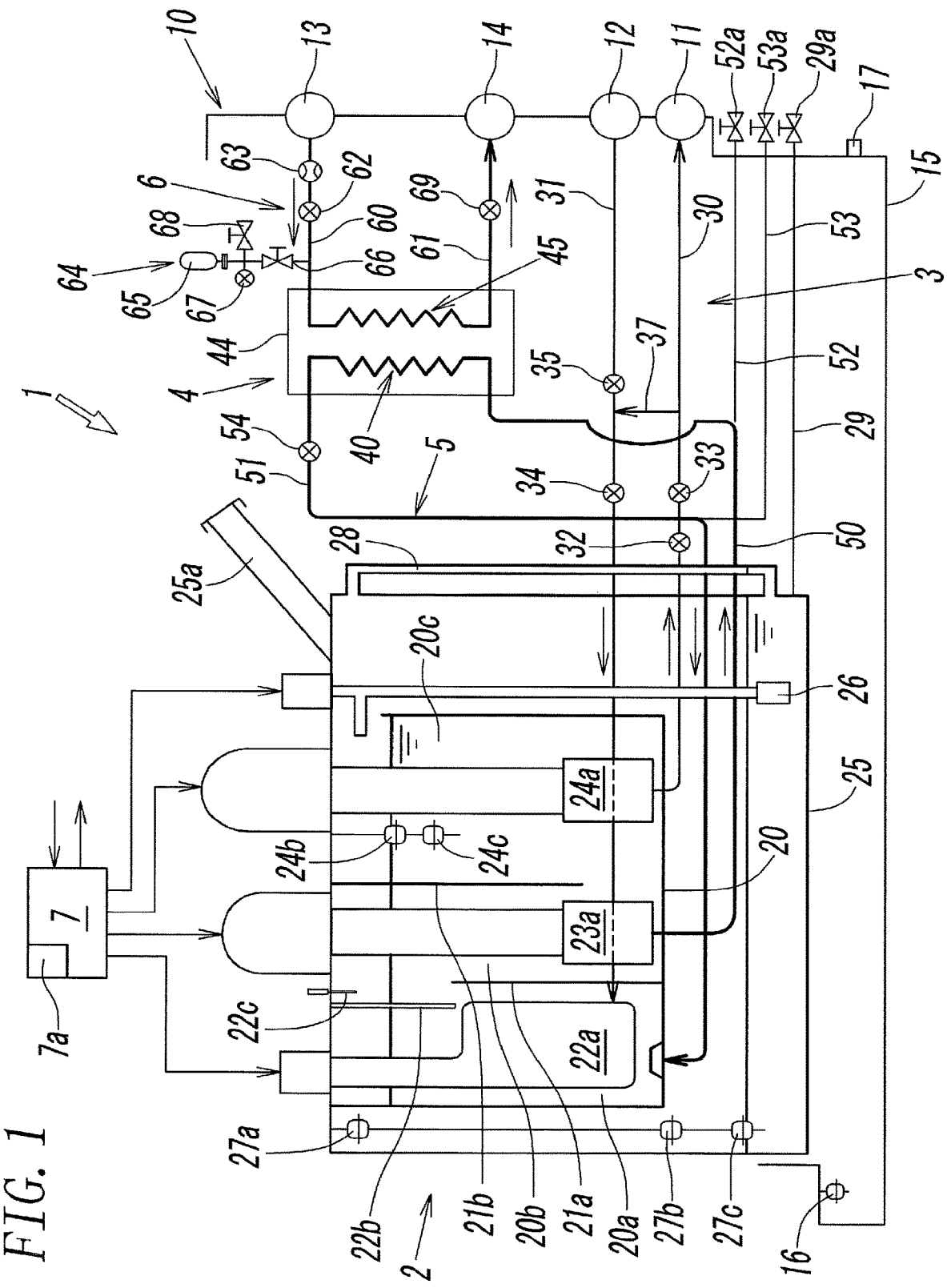
FIG. 1 is a schematic circuit diagram of a temperature control apparatus according to the present invention.

FIGS. 1 to 4 illustrate an embodiment of a temperature control apparatus according to the present invention. The temperature control apparatus 1 is especially suitable for controlling an external load (not illustrated) to a predetermined high temperature higher than, for example, 100° C., by regulating the temperature of circulating liquid whose boiling point is higher than 100° C. to a temperature higher than 100° C. and supplying the circulating liquid to the load.

The temperature control apparatus 1 includes a casing 10 covering the outside of the apparatus 1, a tank unit 2 containing and storing circulating liquid, a circulating-liquid ejection circuit 3 that discharges the circulating liquid from the tank unit 2 to an external load (not illustrated) and returns the circulating liquid received from the load to the tank unit 2, a circulating-liquid cooling circuit 5 that cools the circulating liquid discharged from the tank unit 2 using a heat exchanger 4 and returns the circulating liquid to the tank unit 2, a coolant supply circuit 6 that introduces coolant to the heat exchanger 4 and lets out the coolant after exchanging heat with the circulating liquid from the heat exchanger 4, and a control unit 7 that controls, for example, the temperature and the flow rate, of the circulating liquid flowing through the circulating-liquid ejection circuit 3 and the circulating-liquid cooling circuit 5.

The tank unit 2, the circulating-liquid ejection circuit 3, the heat exchanger 4, the circulating-liquid cooling circuit 5, the coolant supply circuit 6, and the control unit 7 are housed in the one casing 10. A circulating-liquid ejection port 11 and a circulating-liquid return port 12 of the circulating-liquid ejection circuit 3 and a coolant supply port 13 and a coolant discharge port 14 of the coolant supply circuit 6 are provided on the outer peripheral side of the casing 10. This allows the pipes of the target apparatus (load) of temperature control on the user side, a coolant chiller, and so on to be connected to these openings (ports) 11, 12, 13, and 14.

A drain pan 15 for receiving leaked circulating liquid and coolant is disposed at the bottom of the casing 10. The drain pan 15 includes a float-type leakage sensor 16, which is electrically connected to the control unit 7, and a drain port 17, which always opens to the outside to discharge the liquid accumulated in the drain pan 15 to the outside. This allows, for example, when a large amount of circulating liquid or coolant leaks in the apparatus 1 and the leakage sensor 16 detects the leakage, a notice of the detection result to be given or the power source of the apparatus 1 to be turned off.

A suitable example of the circulating liquid is fluorinated liquid with a boiling point of about 200° C. or higher under atmospheric pressure. A suitable example of the coolant is industrial water with a boiling point of 100° C. under atmospheric pressure. In the present embodiment, circulating liquid at 160° C. in the tank unit 2 is discharged to the external load through the circulating-liquid ejection circuit 3, and the circulating liquid at 170° C. after controlling (cooling) the temperature of the load is returned to the tank unit 2 through the circulating-liquid ejection circuit 3. The circulating liquid at 160° C. in the tank unit 2 is discharged to the circulating-liquid cooling circuit 5, is cooled to 100° C. by the heat exchanger 4, and is thereafter returned to the tank unit 2. For the coolant, a coolant at 25° C. is supplied to the heat exchanger 4 through the coolant supply circuit 6, is heated to 30° C. by exchanging heat with the circulating liquid, and is discharged from the heat exchanger 4.

Thus, in the temperature control apparatus 1, the circulating-liquid ejection circuit 3 and the circulating-liquid cooling circuit 5 are connected in parallel to one tank unit 2. In other words, the circulating-liquid ejection circuit 3, which discharges the circulating liquid to the load (the target of temperature control), receives the circulating liquid heated by exchanging heat with the load, and returns the circulating liquid to the tank unit 2, and the circulating-liquid cooling circuit 5, which guides the circulating liquid in the tank unit 2 to the heat exchanger 4 and returns the circulating liquid cooled by exchanging heat with the coolant of the coolant supply circuit 6 in the heat exchanger 4 into the tank unit 2 to regulate the temperature of the circulating liquid discharged from the circulating-liquid ejection circuit 3 to the load, are formed independently from each other, with the tank unit 2 as the center.

More specifically, the tank unit 2 includes a main tank 20 defined by a bottom, sides, and a top, in which circulating liquid with a predetermined depth is stored, and a sub-tank 25 defined by a bottom, sides, and a top likewise and having a larger capacity than the am tank 20, in which the whole of the main tank 20 is housed and reserve circulating liquid is stored.

In the main tank 20, a first partition wall 21a lower than the surface of the circulating liquid stored to a predetermined depth is provided vertically erected from the bottom of the tank 20, and a second partition wall 21b lower than the height of the side from the bottom of the tank 20 is provided downward from the top of the tank 20. Thus, the interior of the main tank 20 is partitioned into three chambers of a first chamber 20a separated by one side of the main tank 20 and the first partition wall 21a, a second chamber 20b separated by the first partition wall 21a and the second partition wall 21b, and a third chamber 20c separated by the second partition wall 21b and another side.

In the main tank 20, the first chamber 20a and the second chamber 20b communicate with each other through a void formed between the upper end of the first partition wall 21a and the top of the tank 20, and the second chamber 20b and the third chamber 20c communicate with each other through a void formed between the lower end of the second partition wall 21b and the bottom of the tank 20. Part of the upper end of the main tank 20 communicates with the sub-tank 25 so that the circulating liquid exceeding the maximum capacity of the main tank 20 can be discharged into the sub-tank 25. The lower end of the first partition wall 21a has a communicating opening (not illustrated) so that the circulating liquid in the main tank 20 can be discharged to the outside via a drain cock 53a through a cooling circulation reverse path 51 connected to the bottom of the main tank 20.

In the first chamber 20a of the main tank 20, a heater 22a that heats the circulating liquid under the control of the control unit 7 is provided in the range from the vicinity of the upper end of the first partition wall 21a to the vicinity of the bottom of the tank 20. In the chamber 20a, a thermostat 22b electrically connected to the control unit 7 is provided in the range from the upper end of the first partition wall 21a to the surface of the circulating liquid when a maximum volume of circulating liquid is stored in the tank 20 (that is, the highest surface of the circulating liquid). This allows the heater 22a to be turned off, for example, when the temperature of the circulating liquid exceeds a predetermined temperature. Furthermore, in the chamber 20a, a temperature fuse 22c, which is electrically connected to the control unit 7 likewise, is provided between the highest surface of the circulating liquid and the top of the tank 20. This allows, for example, when the temperature of the air (air temperature) in the tank 20 becomes higher than a predetermined temperature, determining that the circulating liquid is in an overheated state and turning off the power source of the temperature control apparatus 1.

The second chamber 20b of the main tank 20 is provided with an immersion cooling pump 23a that pumps the circulating liquid on the bottom to the circulating-liquid cooling circuit 5. Furthermore, the third chamber 20c of the tank 20 is provided with an immersion circulation pump 24a that pumps the circulating liquid on the bottom to the circulating-liquid ejection circuit 3. These pumps are also controlled by the control unit 7. The present embodiment uses inverter controlled pumps as the cooling pump 23a and the circulation pump 24a. Furthermore, the third chamber 20c is provided with two upper and lower level switches 24b and 24c at portions higher than the depthwise center. These switches are also electrically connected to the control unit 7. By detecting the level (surface) of the circulating liquid in the main tank 20 using these switches 24*b* and 24*c*, the operating status of an inner pump 26 and so on, described later, s controlled.

The sub-tank 25 houses the immersion inner pump 26 that pumps the circulating liquid on the bottom thereof into the main tank 20 and three level switches 27*a*, 27*b*, and 27*c*, one above the depthwise center of the tank unit 25 and two at lower part. These switches are also electrically connected to the control unit 7. The sub-tank 25 has, on its outer periphery, a level gauge 28 with which the amount of circulating liquid in the tank unit 25 can be visually checked from the outside of the casing 10 and a circulating-liquid inlet 25*a* for supplying circulating liquid into the sub-tank 25 from the outside of the casing 10. Furthermore, a drain pipe 29 is connected to the sub-tank 25, and the end of the drain pipe 29 is let out from the casing 10. The drain pipe 29 has a drain cock 29*a* at the end. The circulating liquid in the sub-tank 25 can be discharged to the outside by opening the drain cock 29*a*. By detecting the level (surface) of the circulating liquid in the sub-tank 25 with the three level switches 27*a*, 27*b*, and 27*c*, for example, the liquid level can be decreased by opening the drain cock 29*a*, or circulating liquid can be supplied to the sub-tank 25 through the circulating-liquid inlet 25*a*.

The circulating-liquid ejection circuit 3 includes a discharge channel 30 connecting the third chamber 20*c* of the main tank 20 in the tank unit 2 and the circulating-liquid ejection port 11 open to the outside of the casing 10 to discharge the circulating liquid to the load and a return channel 31 connecting the circulating-liquid return port 12 open to the outside of the casing 10 to receive the circulating liquid returned from the load and the main tank 20 of the tank unit 2. The circulating liquid in the main tank 20 is discharged to the load through the discharge channel 30 and the circulating-liquid ejection port 11 by the circulation pump 24*a* provided in the third chamber 20*c* of the main tank 20, and the circulating liquid that has controlled the temperature of the load is returned to the main tank 20 through the circulating-liquid return port 12 and the return channel 31.

In this case, the return channel 31 is preferably connected to the first chamber 20*a* which is positioned on the uppermost stream side in the main tank 20 and in which the heater 22*a* is disposed, as illustrated in FIG. 1. This allows, even if the temperature of the circulating liquid returned to the main tank 20 through the return channel 31 changes, the circulating liquid returned to the first chamber 20*a* to be discharged to the discharge channel 30 after being regulated in temperature by the heater 22*a* and the circulating-liquid cooling circuit 5. This allows the circulating liquid regulated to a more accurate temperature to be supplied to the load.

The discharge channel 30 is provided with a first pressure sensor 32 and a first temperature sensor (a discharge-side temperature sensor) 33, and the return channel 31 is provided with a second pressure sensor 34 and a second temperature sensor 35. The discharge channel 30 and the return channel 31 are always connected by a bypass channel 37. This allows, even if the flow of the circulating liquid is stopped at the load connected to the temperature control apparatus 1, the circulating liquid to be returned to the main tank 20 through the bypass channel 37, thereby maintaining the circulating state. The pressure sensors 32 and 34 and the temperature sensors 33 and 35 are electrically connected to the control unit 7. This allows, for example, the heater, the cooling pump, and the circulation pump, to be appropriately controlled on the basis of the measured values from these sensors.

The circulating-liquid cooling circuit 5 includes a cooling circulation forward path 50 connecting the second chamber 20*b* of the main tank 20 in the tank unit 2 and a circulating-liquid inlet 42*a* (FIG. 2) of the heat exchanger 4 and a cooling circulation reverse path 51 connecting a circulating-liquid outlet 43*a* (FIG. 2) of the heat exchanger 4 and the main tank 20 in the tank unit 2. The circulating liquid in the main tank 20 is let flow into the heat exchanger 4 through the cooling circulation forward path 50 by the cooling pump 23*a* provided in the second chamber 20*b* of the main tank 20. The circulating liquid cooled by the heat exchanger 4 and flowing out of the heat exchanger 4 is returned to the main tank 20 through the cooling circulation reverse path 51.

In this case, the cooling circulation reverse path 51 is also preferably connected to the first chamber 20*a* which is positioned on the uppermost stream side in the main tank 20 and in which the heater 22*a* is disposed, like the return channel 31, as illustrated in FIG. 1. This allows the circulating liquid returned to the main tank 20 through the cooling circulation reverse path 51 to be discharged from the most downstream first chamber to the discharge channel 30 after being regulated in temperature together with the circulating liquid returned from the return channel 31. This allows the circulating liquid regulated to a more accurate temperature to be supplied to the load.

A drain pipe 52 for the circulating-liquid cooling circuit 5 is connected to the cooling circulation forward path 50, and the end thereof is let out of the casing 10. The drain pipe 52 has a drain cock 52*a* at the end. The circulating liquid in the circulating-liquid cooling circuit 5 can be discharged to the outside by opening the drain cock 52*a*. A drain pipe 53 for the main tank 20 is connected to the cooling circulation reverse path 51, and the end thereof is let out of the casing 10. The drain pipe 53 also has a drain cock 53*a* at the end. The circulating liquid in the main tank 20 can be discharged to the outside by opening the drain cock 53*a*. The cooling circulation reverse path 51 is provided with a third temperature sensor 54. The temperature sensor 54 is also electrically connected to the control unit 7. This allows, for example, the rotational speed of the cooling pump 23*a* to be controlled by the control unit 7 according to the temperature of the circulating liquid from the third temperature sensor 54.

The coolant supply circuit 6 includes a coolant supply path 60 connecting the coolant supply port 13 which is open to the outside of the casing 10 to receive a coolant and a coolant inlet 48 (FIG. 2) of the heat exchanger 4 and a coolant discharge path 61 connecting a coolant outlet 49 (FIG. 2) of the heat exchanger 4 and the coolant discharge port 14 which is open to the outside of the casing 10 to discharge the coolant. This allows the coolant supplied through the coolant supply port 13 to be introduced into the heat exchanger 4 through the coolant supply path GO and the coolant that has cooled the circulating liquid in the heat exchanger 4 and is discharged from the heat exchanger 4 to be discharged to the outside from the coolant discharge port 14 through the coolant discharge path 61.

The coolant supply path 60 is provided with a fourth temperature sensor 62 and a flowmeter 63. The temperature sensor 62 and the flowmeter 63 are also electrically connected to the control unit 7. This allows detecting abnormalities, for example, in the temperature or the flow rate of the coolant supplied to the heat exchanger 4, and giving an alarm or the like.

In the present embodiment, a pressure regulation unit 64 for regulating the pressure of the coolant is connected to the coolant supply path 60. Thus, even if the coolant is expanded by boiling or the like as a result of heat exchange with the high-temperature circulating liquid in the heat exchanger 4, a problem, such as breakage, in the channel can be prevented by adjusting the pressure of the coolant with the pressure regulation unit 64. The pressure regulation unit 64 may be disposed in the coolant discharge path 61.

The coolant discharge path 61 is also provided with a fifth temperature sensor 69 that is electrically connected to the control unit 7. This allows the temperature of the coolant discharged from the heat exchanger 4 to be, for example, displayed on control unit 7 by the control unit 7.

This pressure regulation unit 64 includes, specifically, an accumulator main body 65 for adjusting the pressure, an on-off valve 66 (a two-way valve) disposed between the accumulator main body 65 and the coolant supply path 60, a pressure gauge 67 disposed between the accumulator main body 65 and the on-off valve 66, and a pressure relief valve (a two-way valve) 68. The on-off valve 66 is always open at least during the operation of the temperature control apparatus 1, and the pressure of the coolant can be monitored by the pressure gauge 67. The pressure relief valve 68 is always closed during the operation of the temperature control apparatus 1. For example, at the maintenance of the temperature control apparatus 1, the pressure in the accumulator main body 65 can be released to the atmosphere by opening the pressure relief valve 68, with the on-off valve 66 closed. The on-off valve 66 and the pressure relief valve 68 may be manually opened and closed as in the present embodiment or may be electrically connected to the control unit 7 so that the opening and closing can be controlled by the control unit 7.

Figure 2:
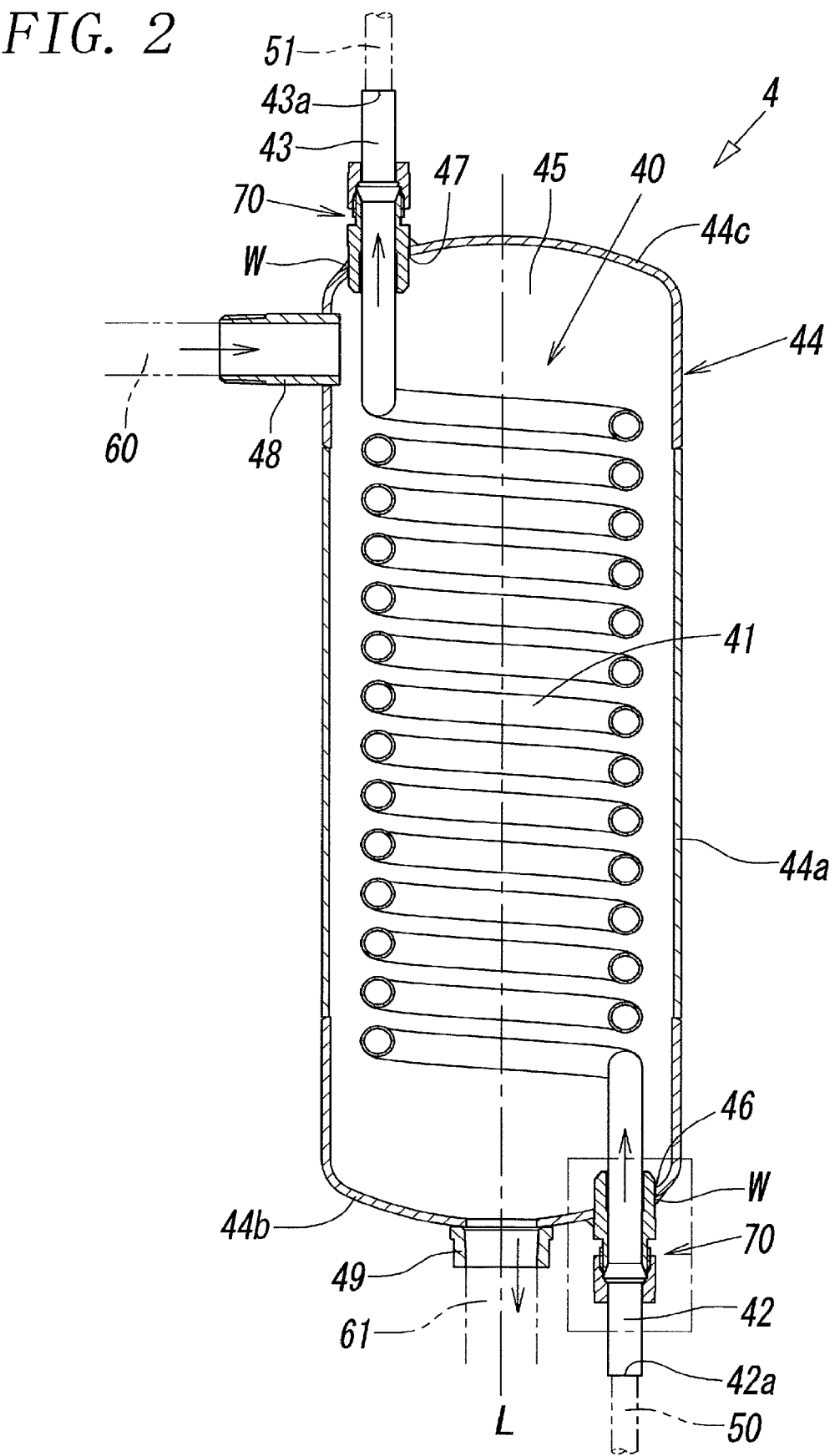
FIG. 2 illustrates the schematic cross-sectional structure of a heat exchanger used in the temperature control apparatus according to the present invention.

As illustrated in FIG. 2, the heat exchanger 4 is entirely made of a metal material, such as stainless steel, extends along the longitudinal axis L, and includes a first heat exchange channel 40 through which the circulating liquid of the circulating-liquid cooling circuit 5 flows and a second heat exchange channel 45 through which the coolant for cooling the circulating liquid in the first heat exchange channel 40 flows.

The first heat exchange channel 40 is integrally, seamlessly formed of a helical channel portion 41 forming a helical shape around the axis L and extending in the axis L, an inflow channel portion 42 connected to one end of the helical channel portion 41 in the direction of the axis L and extending linearly along the axis L, and an outflow channel portion 43 connected to the other opposite end and extending linearly along the axis L by bending one metal pipe.

The first heat exchange channel 40 has a circulating-liquid inlet 42a for introducing the circulating liquid into the heat exchanger 4 and a circulating-liquid outlet 43a for discharging the circulating liquid cooled by heat exchange from the heat exchanger 4 at the opposite ends of the inflow channel portion 42 and the outflow channel portion 43 from the ends connected to the helical channel portion 41 (that is, the opposite ends of the first heat exchange channel 40 in the direction of axis L), respectively.

In contrast, the second heat exchange channel 45 is a channel space formed in a hollow metal shell 44. The helical channel portion 41 of the first heat exchange channel 40 is housed in the second heat exchange channel 45. The shell 44 is formed integrally with a hollow, cylindrical side wall 44a extending in the direction of axis L, a hollow domical first end wall 44b that blocks one end of the cylindrical side wall 44a in the direction of axis L, and a hollow domical second end wall 44c that blocks the other end likewise. In other words, the axis of the first heat exchange channel 40 is aligned with the axis of the cylindrical side wall 44a of the shell 44.

The first end wall 44b and the second end wall 44c of the shell 44 have a first mounting opening 46 and a second mounting opening 47 for fixing the inflow channel portion 42 and the outflow channel portion 43 of the first heat exchange channel 40 to the shell 44, respectively, with the inflow channel portion 42 and the outflow channel portion 43 let out from the second heat exchange channel 45 to the outside of the shell 44. In this case, the inflow channel portion 42 and the outflow channel portion 43 are integrally formed of a metal pipe. The shell 44 further includes a coolant inlet 48 for introducing coolant into the second heat exchange channel 45 and a coolant outlet 49 for discharging the coolant after heat exchange with the circulating liquid in the first heat exchange channel 40 through the second heat exchange channel 45. The coolant supply path 60 and the coolant discharge path 61 communicate with the second heat exchange channel 45 via the coolant inlet 48 and the coolant outlet 49, respectively.

In the present embodiment, the coolant inlet 48 is open in the direction perpendicular to the axis L at one end of the shell 44 in the direction of axis L at which the outflow channel portion 43 of the first heat exchange channel 40 is disposed (specifically, an end of the cylindrical side wall 44a adjacent to the second end wall 44c). In contrast, the coolant outlet 49 is open in the direction of axis L at the other end of the shell 44 in the direction of axis L at which the inflow channel portion 42 of the first heat exchange channel 40 is disposed (specifically, the center of the first end wall 44b).

One end of the metal pipe forming the cooling circulation forward path 50 is connected to the circulating-liquid inlet 42a of the inflow channel portion 42 with connecting means, such as welding, and the other end of the metal pipe forming the cooling circulation reverse path 51 is connected to the circulating-liquid outlet of the outflow channel portion 43 with connecting means, such as welding. On the other hand, ends of the pipes forming the coolant supply path 60 and the coolant discharge path 61 are connected to the coolant inlet 48 and the coolant outlet 49, respectively, using connecting means, such as joints or screwing.

The inside diameters of the first and second mounting openings 46 and 47 are formed larger than the outside diameters of the inflow channel portion 42 and the outflow channel portion 43 of the first heat exchange channel 40. Hollow cylindrical members 70 and 70 made of a metal material, such as stainless steel, are fit and fixed on the outer peripheries of the inflow channel portion 42 and the outflow channel portion 43 in a liquidtight manner. The outer peripheries of the cylindrical members 70 and 70 are welded W and W to the shell 44, with the cylindrical members 70 and 70 inserted into the first and second mounting openings 46 and 47, respectively. In other words, the channel portions 42 and 43 are fixed to the shell 44, with the cylindrical members 70 and 70 interposed therebetween.

Thus the use of a device in which the helical channel portion 41 of the first heat exchange channel 40 is housed in the second heat exchange channel (channel space) 45 formed in the hollow shell 44 as the heat exchanger 4 can simplify the structure of the heat exchanger 4, thereby minimizing the welded portion. Moreover, the metal pipe forming the first heat exchange channel through which the high-temperature circulating liquid flows is not directly welded to the shell 44 forming the second heat exchange channel through which the low-temperature coolant flows. This prevents, even in cooling the high-temperature circulating liquid, the occurrence of problems, such as cracks, at the welded portions of the heat exchanger 4 due to the temperature difference between the circulating liquid and the coolant as much as possible. As a result, the durability of the temperature control apparatus 1 against the use of the high-temperature circulating liquid can be enhanced.

Figure 3:
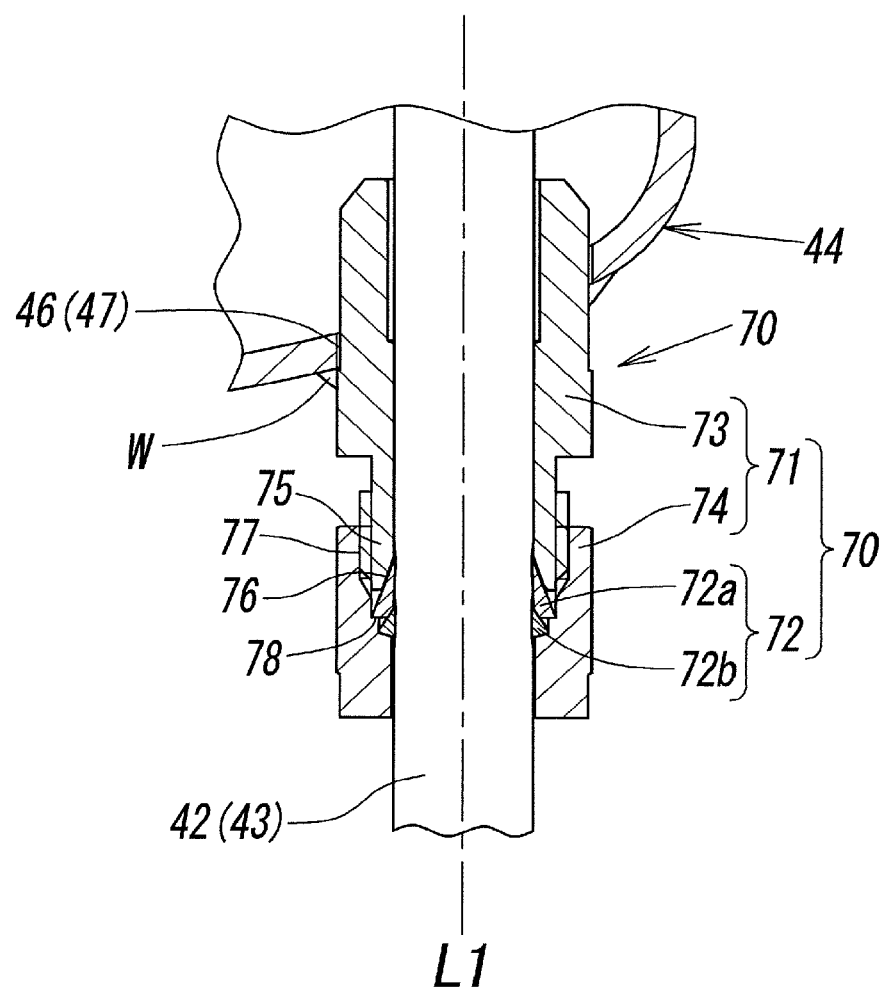
FIG. 3 is an enlarged fragmentary cross-sectional view of a relevant part enclosed by the dashed line in FIG. 2.
Figure 4:
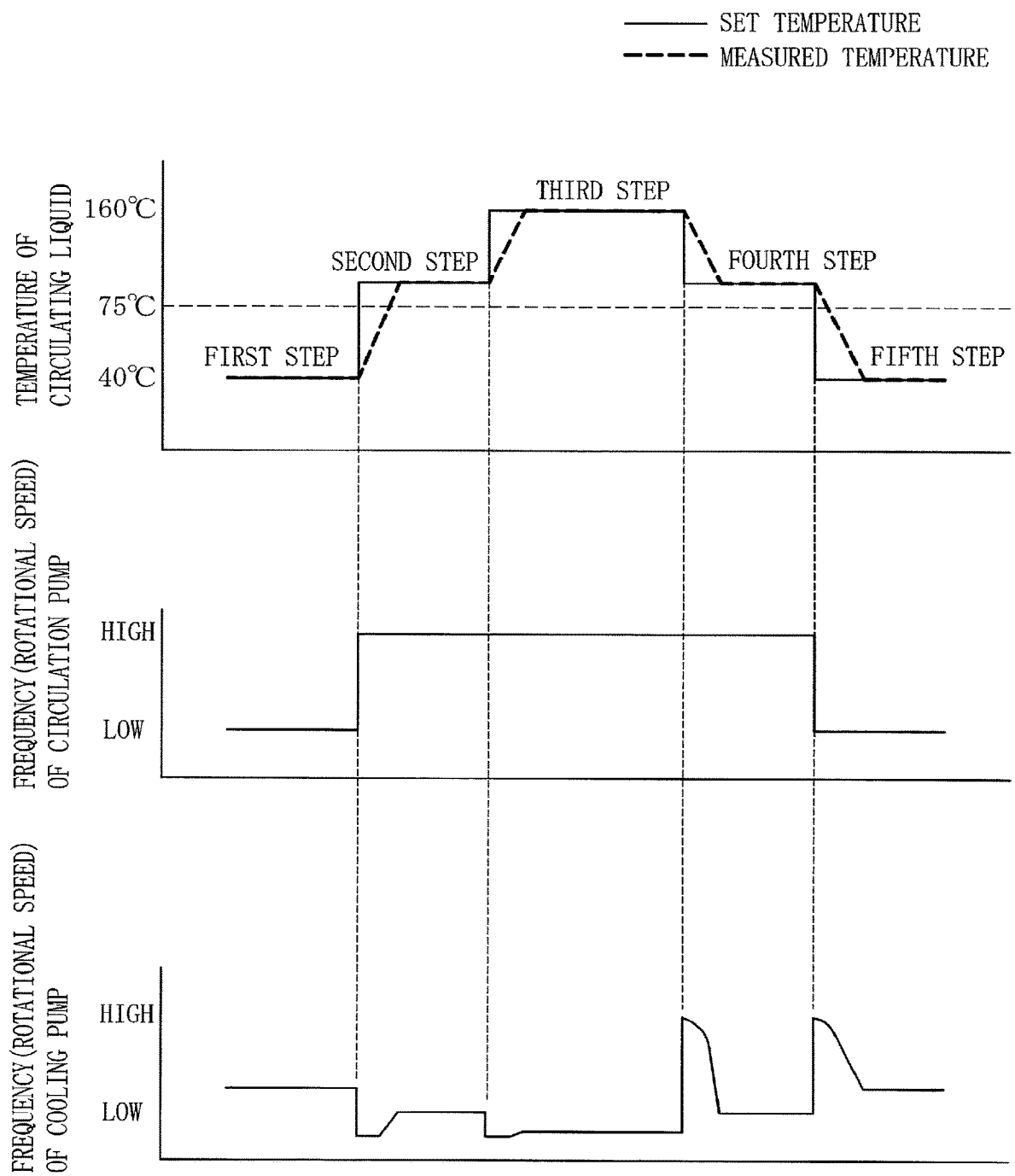
FIG. 4 is a graph showing the correlation among the set temperature and the measured temperature of circulating liquid and the operating states of a circulation pump and a cooling pump controlled according to the temperatures.

Next, the cylindrical member 70 will be specifically described with reference to FIG. 3. The cylindrical member 70 includes a hollow, metal cylindrical body 71 whose opposite ends are open and a metal sealing member 72 that seals the gap between the outer periphery of the metal pipe forming the inflow channel portion 42 and the outflow channel portion 43 and the inner peripheral surface of the body 71 in a liquidtight manner and that fixes the body 71 to the channel portions 42 and 43. The outer periphery of the body is circularly and continuously welded W and W to the shell 44 at the first and second mounting openings 46 and 47 in a state in which part of the body 71 fixed to the channel portions 42 and 43 is inserted into the shell 44 through the openings 46 and 47 from the outside of the shell 44.

The body 71 is formed by combining a fixing cylindrical portion 73 fixed to the shell 44 by the weld W and a sealing cylindrical portion 74 having the sealing member 72 around the inner periphery together. The fixing cylindrical portion 73 integrally has an external thread 75 at an end disposed outside the shell 44. An inclined surface 76 whose inside diameter increases linearly toward the end of the external thread 75 is formed around the inner periphery of the end of the external thread 75. The sealing cylindrical portion 74 has an internal thread 77 around the inner periphery of an end adjacent to the fixing cylindrical portion 73. The sealing cylindrical portion 74 has, at a portion of the inner periphery deeper than the internal thread 77, a shoulder 78 whose inside diameter increases stepwise toward the internal thread 77.

Furthermore, the ring-shaped sealing member 72 has, in cross-section, a wedge shape with an acute angle at an end edge oriented to the fixing cylindrical portion 73. The sealing member 72 is attached to the shoulder 78 of the sealing cylindrical portion 74, with the ring-shaped end edge inclined to the central axis L1. This causes, when the cylindrical portions 73 and 74 are fastened by screwing the internal thread 77 of the sealing cylindrical portion 74 onto the external thread 75 of the fixing cylindrical portion 73, the sealing member 72 to be pushed toward the end edge by the shoulder 78 of the sealing cylindrical portion 74. This causes the end edge of the sealing member 72 to be brought into pressure-contact with the outer periphery of each of the channel portions 42 and 43 into a bitten state. As a result, the gap between each of the channel portions 42 and 43 and the body 71 of the cylindrical member 70 is sealed in a liquidtight manner, and the body 71 is fixed to each of the channel portions 42 and 43.

In the present embodiment, the sealing member 72 includes two ring-shaped first and second wedge-shaped sealing pieces 72a and 72b. The wedge-shaped sealing pieces 72a and 72b are attached to the individual steps of the two-step shoulder 78 of the sealing cylindrical portion 74, as illustrated in FIG. 3.

At that time, the end of the first sealing piece 72a including the end edge enters between the inclined surface 76 of the external thread 75 and each of the outer peripheries of the inflow channel portion 42 and the outflow channel portion 43. This causes the end of the first sealing piece 72a to be brought into pressure-contact with the inclined surface 76 and the end edge of the sealing piece 72a to be brought into pressure-contact with the outer periphery of each of the channel portions 42 and 43 in a bitten state.

The second sealing piece 72b is disposed at a rear end of the first sealing piece 72a opposite to the end edge. An end of the second sealing piece 72b including the end edge enters between the rear end of the first sealing piece 72a and the outer periphery of each of the channel portions 42 and 43. This causes the rear end of the first sealing piece 72a to expand and the end edge of the second sealing piece 72b to be brought into pressure-contact with the outer periphery of each of the channel portions 42 and 43. An example substitute for the cylindrical member 70 is a bite joint including two ring-shaped ferrules serving as the wedge-shaped sealing pieces 72a and 72b.

As illustrated in FIG. 1, the control unit 7 includes a temperature setting unit 7a for appropriately setting the temperature of the circulating liquid to be discharged to the load through the discharge channel 30. A method for controlling the cooling pump 23a and the circulation pump 24a according the set temperature of the circulating liquid using the control unit 7 will be described hereinbelow with reference to the graph in FIG. 4. In the present embodiment, a predetermined threshold temperature (75° C.) is set in the control unit 7 for the temperature of the circulating liquid to be delivered to the load. The fact that the delivery temperature of the circulating liquid is higher than the threshold temperature indicates that the temperature control apparatus 1 is in operation. The fact that the delivery temperature is lower than or equal to the threshold temperature indicates that the temperature control apparatus 1 is at idle (at rest).

First, in the first step, in a state in which the set temperature of the circulating liquid is set to a temperature (40° C.) lower than the threshold temperature (75° C.), and the delivery temperature of the circulating liquid (hereinafter referred to as "measured temperature") measured by the first temperature sensor 33 of the discharge channel 30 is also decreased to the set temperature, in other words, the temperature control apparatus 1 is at idle, the inverter-controlled cooling pump and circulation pump are maintained at a predetermined low rotational speed (low frequency) by the control unit 7.

In the second step, upon setting the set temperature of the circulating liquid to a temperature higher than the threshold temperature, the rotational speed of the circulation pump 24a is switched to a high rotational speed (high frequency), and the high rotational speed is maintained.

For the cooling pump 23a, the rotational speed is further decreased once and is thereafter gradually increased at a predetermined timing before the temperature of the circulating liquid measured by the temperature sensor 33 reaches the set temperature. Thereafter, the increase in the rotational speed is stopped at the point in time the measured temperature reaches the set temperature, so that the measured temperature and the set temperature are equalized. In this state, the rotational speed (lower than that in the first step) is maintained.

Subsequently, in the third step, when the set temperature of the circulating liquid is further increased, the rotational speed of the circulation pump 24a is maintained at the predetermined rotational speed following the second step.

For the cooling pump 23a, the rotational speed is decreased to the same rotational speed as that in the second step once concurrently therewith and is then gradually increased again at a predetermined timing before the measured temperature of the circulating liquid reaches the set temperature. At that time, the gradient of the change in rotational speed is smaller than that in the second step.

Thereafter, the increase in rotational speed is stopped at the point in time the measured temperature of the circulating liquid reaches the set temperature, so that the measured temperature and the set temperature are equalized. In this state, the rotational speed (lower than that in the first step and the second step) is maintained, as in the second step.

Next in the fourth step, when the set temperature of the circulating liquid is decreased to the set temperature of the second step, the rotational speed of the circulation pump 24a is maintained at the predetermined high rotational speed following the third step.

For the cooling pump 23a, the rotational speed is increased to a rotational speed higher than the idling rotational speed of the first step once concurrently therewith and is then gradually decreased at a predetermined timing before the measured temperature of the circulating liquid reaches the set temperature. Thereafter, the decrease in the rotational speed is stopped at the point in time the measured temperature of the circulating liquid reaches the set temperature, so that the measured temperature and the set temperature are equalized. In this state, the rotational speed (the same rotational speed as that in the second step) is maintained.

Subsequently, in the fifth step, when the set temperature of the circulating liquid is further decreased to the set temperature (40° C.) of the first step, the rotational speed of the circulation pump 24a is switched to the same predetermined low rotational speed as that in the first step, and the low rotational speed is maintained.

For the cooling pump 23a, the rotational speed is increased to the same rotational speed as that in the fourth step once concurrently therewith and is thereafter gradually decreased again at a predetermined timing before the measured temperature of the circulating liquid reaches the set temperature. At that time, the gradient of the change in rotational speed is smaller than that in the fourth step. Thereafter, the decrease in the rotational speed is stopped at the point in time the measured temperature of the circulating liquid reaches the set temperature, so that the measured temperature and the set temperature are equalized to each other. In that state, the rotational speed (the same rotational speed as that in the first step) is maintained.

In other words, in the present embodiment, when the temperature of the circulating liquid set by the temperature setting unit 7a is lower than a predetermined threshold temperature, the rotational speed of the circulation pump 24a is maintained at a low rotational speed, and when it is higher than the predetermined threshold temperature, the rotational speed of the circulation pump 24a is maintained at a high rotational speed.

When the set temperature is increased by the temperature setting unit 7a, the rotational speed of the cooling pump 23a is decreased once and is thereafter gradually increased. When the set temperature is decreased, the rotational speed of the cooling pump 23a is increased once and is thereafter gradually decreased. When the temperature of the circulating liquid measured by the first temperature sensor 33 in the discharge channel 30 (that is, the measured temperature of the circulating liquid) becomes equal to the set temperature, the rotational speed at that time is maintained.

In increasing the set temperature, the higher the set temperature, the smaller the gradient of the change in the rotational speed when the rotational speed of the cooling pump 23a is decreased once and is thereafter gradually increase is set. In decreasing the set temperature, the lower the set temperature, the smaller the gradient of the change in the rotational speed when the rotational speed is increased once and is thereafter gradually decreased is set.

Thus, in the present embodiment, the circulation pump 24a is immersed in the circulating liquid in the main tank 20, and when the set temperature of the circulating liquid is higher than a predetermined threshold temperature, the rotational speed of the circulation pump 24a is maintained at a high rotational speed. This allows the temperature of the circulating liquid to be efficiently increased to a set temperature and to be maintained at the temperature using the heat generated in the circulation pump 24a in addition to the heater 22a.

Furthermore, when the set temperature of the circulating liquid is set from the temperature higher than the threshold temperature to a lower temperature, the rotational speed of the circulation pump 24a is decreased to a lower rotational speed and is maintained at the lower rotational speed, and at the same time, the rotational speed of the cooling pump 23a increases. This allows suppressing the heat generation of the circulation pump 24a and accelerating the cooling of the circulating liquid with the heat exchanger 4, thereby efficiently decreasing the temperature of the circulating liquid to the set temperature.

REFERENCE SIGNS LIST

1 TEMPERATURE CONTROL APPARATUS
2 TANK UNIT
4 HEAT EXCHANGER
7 CONTROL UNIT
7a TEMPERATURE SETTING UNIT
11 CIRCULATING-LIQUID EJECTION PORT
12 CIRCULATING-LIQUID RETURN PORT
13 COOLANT SUPPLY PORT
14 COOLANT DISCHARGE PORT
22a HEATER
23a COOLING PUMP
24a CIRCULATION PUMP
30 DISCHARGE CHANNEL
31 RETURN CHANNEL
33 FIRST TEMPERATURE SENSOR (DISCHARGE-SIDE TEMPERATURE SENSOR)
40 FIRST HEAT EXCHANGE CHANNEL
41 HELICAL CHANNEL PORTION
42 INFLOW CHANNEL PORTION
42a CIRCULATING-LIQUID INLET
43 OUTFLOW CHANNEL PORTION
43a CIRCULATING-LIQUID OUTLET
44 SHELL
45 SECOND HEAT EXCHANGE CHANNEL (CHANNEL SPACE)
46 FIRST MOUNTING OPENING
47 SECOND MOUNTING OPENING
50 COOLING CIRCULATION FORWARD PATH
51 COOLING CIRCULATION REVERSE PATH
60 COOLANT SUPPLY PATH
61 COOLANT DISCHARGE PATH
64 PRESSURE REGULATION UNIT
70 CYLINDRICAL MEMBER
71 CYLINDRICAL BODY
72 SEALING MEMBER
72a FIRST WEDGE-SHAPED SEALING PIECE
72b SECOND WEDGE-SHAPED SEALING PIECE
73 FIXING CYLINDRICAL PORTION
74 SEALING CYLINDRICAL PORTION
75 EXTERNAL THREAD
76 INCLINED SURFACE
77 INTERNAL THREAD
78 SHOULDER

L AXIS
W WELD (WELDED PORTION)

The invention claimed is:

1. A temperature control apparatus for controlling an external load to a predetermined high temperature by regulating a circulating liquid having a boiling point higher than 100° ° C. to a temperature higher than 100° C. and supplying the circulating liquid to the load, the temperature control apparatus comprising:
   a tank storing circulating liquid and including a heater for heating the circulating liquid;
   a discharge channel connecting the tank and a circulating-liquid ejection port for discharging the circulating liquid to the load;
   a circulation pump that pumps the circulating liquid from the tank to the discharge channel;
   a return channel connecting a circulating-liquid return port that receives the circulating liquid returned from the load and the tank;
   a heat exchanger including a first heat exchange channel through which the circulating liquid flows and a second heat exchange channel through which coolant for cooling the circulating liquid in the first heat exchange channel;
   a cooling circulation forward path for supplying the circulating liquid from the tank to the first heat exchange channel of the heat exchanger;
   a cooling circulation reverse path for returning the circulating liquid cooled by the heat exchanger from the first heat exchange channel to the tank;
   a cooling pump that pumps the circulating liquid from the tank to the cooling circulation forward path;
   a coolant supply path for introducing the coolant to the second heat exchange channel of the heat exchanger;
   a coolant discharge path for discharging the coolant after the heat exchange from the second heat exchange channel;
   a discharge-side temperature sensor provided in the discharge channel to measure a temperature of the circulating liquid discharged to the load; and
   an electronic controller configured to set the temperature of the circulating liquid to be discharged to the load, the electronic controller being for controlling rotational speeds of the circulation pump and the cooling pump based on a measurement result of the discharge-side temperature sensor and the set temperature of the circulating liquid,
   wherein, in the heat exchanger, the first heat exchange channel includes a helical channel portion extending in a helical form along an axis, an inflow channel portion connected to one end of the helical channel portion and including a circulating-liquid inlet, and an outflow channel portion connected to the other end of the helical channel portion and including a circulating-liquid outlet, and the second heat exchange channel is a channel space formed in a hollow shell,
   wherein the helical channel portion of the first heat exchange channel is housed in the second heat exchange channel in the shell, the inflow channel portion and the outflow channel portion are let out from the shell, the cooling circulation forward path is connected to the circulating-liquid inlet, and the cooling circulation reverse path is connected to the circulating-liquid outlet,
   wherein the coolant supply path communicates with the second heat exchange channel through a coolant inlet provided on the shell, and the coolant discharge path communicates with the second heat exchange channel through a coolant outlet provided on the shell,
   wherein the circulation pump is immersed in the circulating liquid in the tank, and
   wherein the electronic controller is configured, when the set temperature of the circulating liquid is lower than a predetermined threshold temperature, to maintain the rotational speed of the circulation pump to a low rotational speed, and when the temperature is higher than the predetermined threshold temperature, to maintain the rotational speed of the circulation pump to a high rotational speed, and
   wherein the electronic controller is configured, when the set temperature of the circulating liquid is increased, to decrease the rotational speed of the cooling pump once and thereafter gradually increase the rotational speed, and when the set temperature is decreased, to increase the rotational speed of the cooling pump once and thereafter gradually decrease the rotational speed, and when the temperature of the circulating liquid measured by the discharge-side temperature sensor is equal to the set temperature, to maintain the rotational speed at that time.

2. The temperature control apparatus according to claim 1,
   wherein the cylindrical members fitted on the inflow channel portion and the outflow channel portion each include a cylindrical body made of metal and a ring-shaped sealing member made of metal disposed on an inner periphery of the cylindrical body to seal an outer periphery of the channel portion, wherein an outer periphery of the cylindrical body is welded to the shell in a ring shape.

3. The temperature control apparatus according to claim 2,
   wherein the cylindrical body includes a fixing cylindrical portion fixed to the shell by the welding and a sealing cylindrical portion having the ring-shaped sealing member on the inner periphery thereof, wherein the sealing cylindrical portion is fastened to the fixing cylindrical portion by screwing, and
   wherein the ring-shaped sealing member is acutely angled at an end edge adjacent to the fixing cylindrical portion, wherein, when the sealing cylindrical portion is screwed to the fixing cylindrical portion, the end edge of the ring-shaped sealing member is brought into pressure-contact with each of the outer peripheries of the inflow channel portion and the outflow channel portion into a bitten state by pressure of the sealing cylindrical portion.

4. The temperature control apparatus according to claim 1,
   wherein, in the shell, the coolant outlet to which the coolant discharge path is connected is disposed at one axial end at which the inflow channel portion is disposed, and the coolant inlet to which the coolant supply path is connected is disposed at the other axial end at which the outflow channel portion is disposed.

5. The temperature control apparatus according to claim 1,
   wherein the electronic controller is configured such that, in increasing the set temperature, the higher the set temperature, the smaller a gradient of a change in the rotational speed of the cooling pump when the rotational speed is decreased once and is thereafter gradually increased, and in decreasing the set temperature, the lower the set temperature, the smaller the gradient of a change in the rotational speed when the rotational speed is increased once and is thereafter gradually decreased.

6. The temperature control apparatus according to claim 1, wherein a pressure regulation unit for regulating the pressure of the coolant flowing through the channel of the coolant is connected to the channel of the coolant, the pressure regulation unit including an accumulator main body which adjusts the pressure of the coolant.

7. The temperature control apparatus according to claim 1, wherein the helical channel portion is arranged between the coolant inlet and the coolant outlet in the axial direction.

8. The temperature control apparatus according to claim 1, wherein cylindrical members made of metal are individually fitted on the inflow channel portion and the outflow channel portion of the first heat exchange channel made of a metal pipe,
wherein the shell made of metal includes a pair of mounting openings for letting the inflow channel portion and the outflow channel portion out from the shell and for mounting the cylindrical members fitted on the channel portions into the shell from the outside, and
wherein, at the mounting openings, outer peripheries of the cylindrical members are fixed to the shell by welding.

* * * * *